(12) United States Patent
Arnold et al.

(10) Patent No.: US 7,158,242 B2
(45) Date of Patent: Jan. 2, 2007

(54) METHOD TO DETERMINE THE VOLUME OF SMALL, SPHERICAL MOVING OBJECTS

(75) Inventors: Martin Arnold, Hufingen (DE); Norbert Irmer, Villingen-Schwenningen (DE)

(73) Assignee: Minebea Co., Ltd., Nagano-ken (JP)

( * ) Notice: Subject to any disclaimer, the term of this patent is extended or adjusted under 35 U.S.C. 154(b) by 195 days.

(21) Appl. No.: 10/967,494

(22) Filed: Oct. 14, 2004

(65) Prior Publication Data

US 2005/0083538 A1  Apr. 21, 2005

(30) Foreign Application Priority Data

Oct. 18, 2003 (DE) .............................. 103 48 950

(51) Int. Cl.
*G01B 11/22* (2006.01)
*G01N 15/02* (2006.01)
(52) U.S. Cl. ...................................... 356/627; 356/335
(58) Field of Classification Search ................ 356/627, 356/335, 336
See application file for complete search history.

(56) References Cited

U.S. PATENT DOCUMENTS

| | | | | |
|---|---|---|---|---|
| 4,842,406 A | * | 6/1989 | VonBargen | ................. 356/336 |
| 6,813,020 B1 | * | 11/2004 | Roques et al. | ............. 356/336 |
| 2003/0071197 A1 | * | 4/2003 | Sugiyama | ............... 250/214 A |

* cited by examiner

*Primary Examiner*—Gregory J. Toadey, Jr.
*Assistant Examiner*—Roy M. Punnoose
(74) *Attorney, Agent, or Firm*—Fulbright & Jaworski L.L.P.

(57) ABSTRACT

The invention relates to a method to determine the volume of small, spherical moving objects in which the objects move through the optical path of a photo electric sensor that comprises at least one light beam transmitter and one light beam receiver, and the change in the light intensity at the light beam receiver caused by objects passing through the optical path is registered and converted into an electrical measurement signal by means of an evaluation unit.

The invention is distinguished by the fact that before a measurement process, the amplitude of the electric measurement signal is calibrated to a previously determined average standard volume of the objects and during the measurement process, the volume of each measured object is determined using the change in amplitude of the measurement signal.

6 Claims, 2 Drawing Sheets

METHOD TO DETERMINE THE VOLUME OF SMALL, SPHERICAL MOVING OBJECTS

BACKGROUND OF THE INVENTION

The invention relates to a method to determine the volume of small, spherical moving objects by movement through the optical path of a photo electric sensor.

OUTLINE OF THE PRIOR ART

Photo electric sensors are frequently used to detect and count moving objects. The measurement volumes of photo electric sensors without additional beam-forming optics that are available on the market are too large, that is, the diameter of the optical path is too large, to detect very small individual objects with a high repeat rate and with short object spacing. An evaluation unit analyzes the changes in the signal of the photo electric sensor when an object passes and recognizes the object in this way. However, particularly for very small objects, environmental influences, electrical disturbances and transit phenomena result in faulty detection since the signal picked up by the light beam receiver is very small compared to the interfering signals.

German Patent Application No. 103 38 108.2 submitted by the same applicant and unpublished, describes a device and a method that enables very small objects, in particular drops of liquid having dimensions in the sub-mm range, to be reliably detected and counted.

The facts disclosed in DE 103 38 108.2 are thus described herein.

In some applications, such as when a specific volume of liquid is to be dosed using a microdispenser, it is not only necessary to count the drops, but also to determine their volume. If a specific volume is to be dosed, for example, the total volume of the drops is found by counting the number of drops and multiplying this by the volume of a (previously determined) single drop. It has been shown in practice, however, that the drops dispensed by a microdispenser do not always have the same diameter so that the total volume calculated using this method is relatively inexact. It is clear that the known method to determine the volume of an object needs to be improved.

SUMMARY OF THE INVENTION

The object of the invention is to provide a device that enables small, approximately spherical, moving objects to be precisely detected and their volume determined. It should be possible to add the measured volume of several individual objects to produce a total volume.

In the method outlined, the objects move through the optical path of a photo electric sensor that comprises at least one light beam transmitter and one light beam receiver, and the change in the light intensity at the light beam receiver caused by objects passing through the optical path is registered and converted into an electrical measurement signal by means of an evaluation unit.

The invention is distinguished by the fact that before a measurement process, the amplitude of the electric measurement signal is calibrated to a previously determined average standard volume of the objects, and during the measurement process, the volume of each measured object is determined using the change in amplitude of the measurement signal.

Calibrating the measurement setup to a specific standard volume of the objects ensures on the one hand that the sensitivity of the measurement setup, that is the measuring range and the signal amplification, is automatically always adjusted to the best possible value. On the other hand, there is the further advantage that momentary interfering influences caused by surrounding conditions are suppressed due to such automatic calibration.

Calibration to a standard volume enables the actual volume of an object to be determined quite precisely using the shading of the luminous flux of the photo electric sensor by the cross-sectional area of the object.

As a rule, the volume is determined using a large number of objects, the volumes of all measured objects being added up to form a total volume in the evaluation unit.

The measuring setup is preferably calibrated by a defined change in the luminous flux generated by the light beam transmitter which corresponds to a change in the amplitude of the signal measured by the light beam receiver and thus to a specific shadow area.

An application-related embodiment of the invention will now be explained in more detail on the basis of the figures. Further characteristics, advantages and applications of the invention can be derived from the drawings and their description.

DESCRIPTION OF A PREFERRED EMBODIMENT OF THE INVENTION

The device described in patent application DE 103 38 108.2 can basically be used to detect objects and to determine their volume. One possible application of the invention is to count drops of liquid, particularly drops having a diameter in the sub-mm range.

Figure 1:
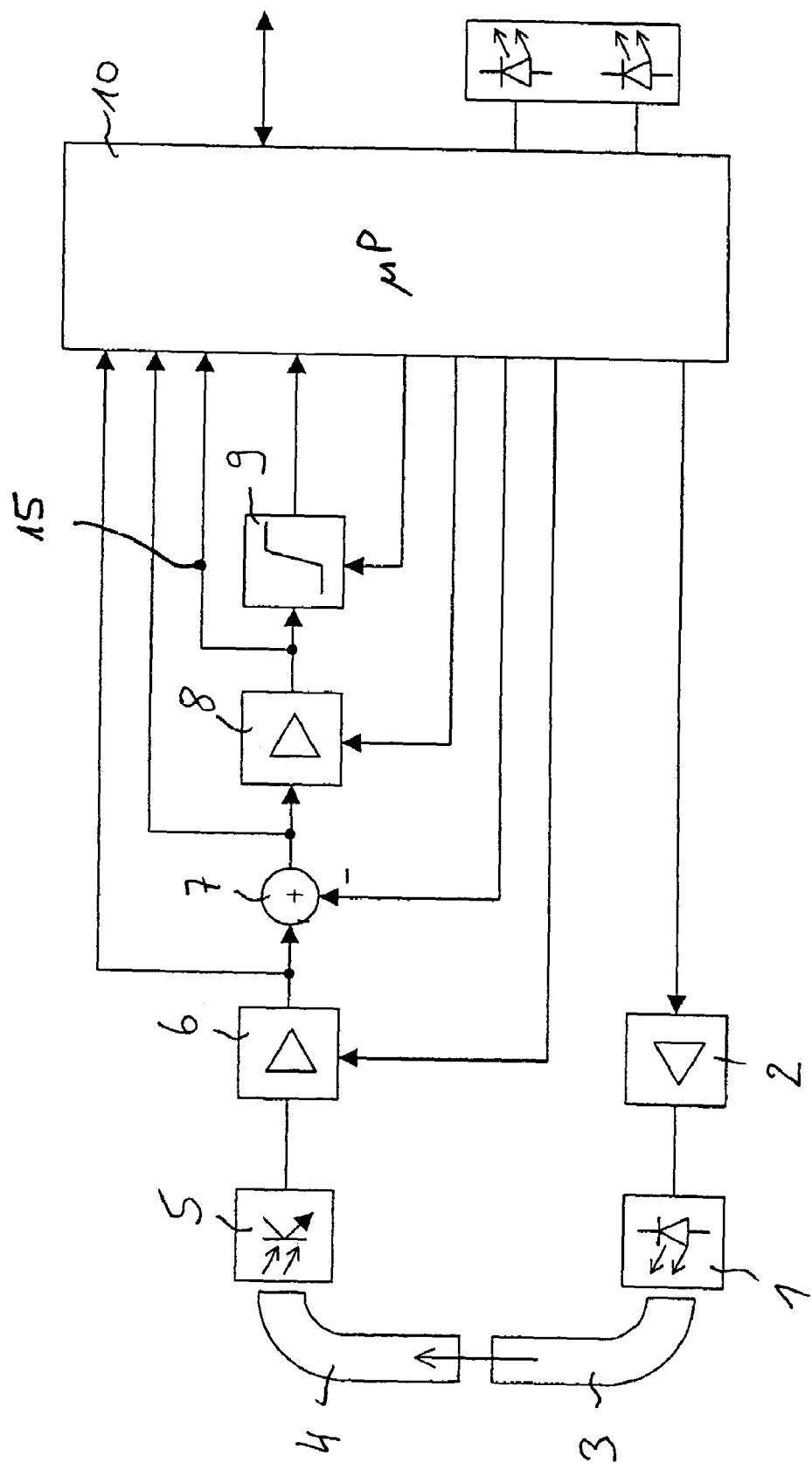
FIG. 1 shows a schematic block diagram of the detection device suitable for carrying out the method.

As can be seen in FIG. 1, the device comprises a light beam transmitter 1, such as a light-emitting diode or a laser diode that is controlled by a driver 2. The light is fed to a first bundle of optical waveguides 3 whose inputs are connected to the light beam transmitter 1. The input cross-section of the bundle of optical waveguides is adjusted to the cross-section of the light beam transmitter used, e.g. circular. The outputs of the individual optical waveguides 3 are arranged in a row alongside each other and form a flat strip. The light beams emitted by the outputs define the optic path of the photo electric sensor and pass a detection volume through which the objects that are to be detected move.

A second bundle of optical waveguides 4 is located opposite the outputs of the first optical waveguides 3 whose inputs are likewise arranged in a row alongside each other and which pick up light beams emitted by the first bundle of optical waveguides 3. The outputs of the optical waveguides 4 are connected to a light beam receiver 5 which registers the light signals and transforms them into electric signals. A photo-diode or photo-transistor can, for example, be used as a light beam receiver 5.

An evaluation unit is coupled to the light beam transmitter 1 and the light beam receiver 5 and records the change in light intensity produced by the objects passing the optic path. For this purpose, the electrical signal coming from the light beam receiver 5 is amplified in a first amplifier 6. A voltage is subtracted from this amplified signal in an adder 7 whose absolute value approximately corresponds to the direct voltage portion of the signal voltage. The signal is then amplified again in a second amplifier 8. Changes in the signal at the light beam receiver 5 can now be analyzed over the full range of the amplifier 8 since the direct voltage portion has been removed in the adder 7. A switching threshold is then detected using a threshold value switch 9 and the output signal is fed to a counter circuit which takes the form of a microprocessor control 10.

Using the microprocessor 10, the volume of the object 11 can be determined in accordance with the invention from the measurement signal 15 which is picked up as an analogue signal before the threshold value switch.

The output signal of the photo electric sensor is fed to the above-mentioned self-compensating amplification circuit. In the signal waveform, the resulting measurement signal 15 contains the speed (corresponding to the duration of the measurement pulse in time) and the shadow area (corresponding to the amplitude U of the measurement pulse) of the moving object 11. The maximum value of the change in signal is a measurement for the maximum shadow area of an object to be detected. This can be used as the basis for determining the volume. The amplification circuit compensates itself in such a way that a change in luminous flux (dphi), caused by a simulated standard drop, determines the amplification of the amplitude in the amplification circuit. Among other factors, this also goes to compensate the influence of the photo electric barrier.

Figure 2:
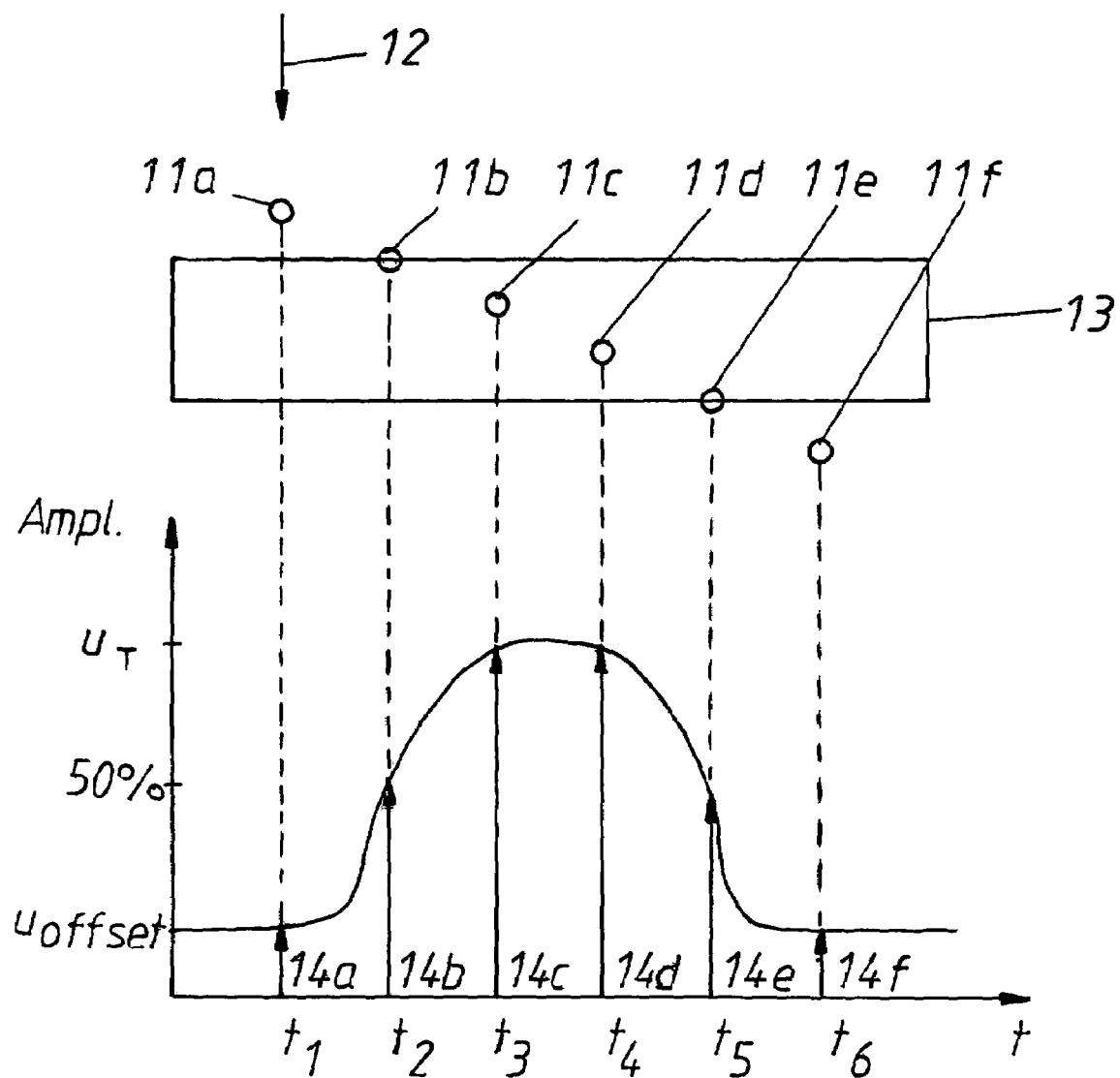
FIG. 2 schematically shows an object 11 passing the optical path of the photo electric sensor and the corresponding waveform of the measurement signal over time.

FIG. 2 shows the effective detection area 13 of the photo electric sensor through which an object 11, a drop of liquid for example, moves. The drop 11 moves in the direction of the arrow 12, a total of six movement phases of the drop (drop 11a, 11b, 11c, 11d, 11e, 11f) being illustrated over time t.

In the first movement phase at time $t_1$, the drop 11a is still totally outside detection zone 13 of the photo electric sensor. The associated measurement signal 14a does not show any change compared to a reference level $U_{Offset}$ (offset). In the second movement phase at time $t_2$, the drop 11b enters into the detection zone 13 of the photo electric sensor with half of its cross-sectional area already being within the detection zone 13. The measurement signal 14b shows a deflection corresponding to half the maximum amplitude $U_T$.

During the third and fourth movement phases (times $t_3$ and $t_4$), the object 11c and 11d respectively are totally within the optical path of the photo electric sensor. The measurement signal shows a deflection 14c and 14d respectively corresponding to the maximum amplitude $U_T$.

In the fifth movement phase at time $t_5$, the drop 11e leaves the detection zone of the photo electric sensor with half of its cross-sectional area being outside the detection zone 13. The measurement signal 14e thus shows a deflection corresponding to half the maximum amplitude $U_T$.

In the sixth movement phase at time $t_6$, the drop 14f is totally outside detection zone of the photo electric sensor. The associated measurement signal 14f does not show any change compared to a reference level $U_{Offset}$ (offset).

A drop 11 that falls through this photo electric sensor generates the measurement signal described above whose maximum amplitude $U_T$ is proportional to the shadow area of the drop 11. The shadow area in turn is proportional to the square of the diameter d of the drop 11. This means $$U_T \sim \pi d^2 / 4$$

applies and thus $$d \sim (U_T)^{1/2}$$

The volume V of a drop is proportional to the drop diameter d raised to the power of three:

$$V \sim d^3$$

This means that the volume V of the drop is proportional to the square root of the signal amplitude raised to the power of three.

$$V \sim (U_T)^{3/2}$$

The sum of the volumes of a number N of measured objects is a measurement for the dosed total volume $V_{ges}$.

$$V_{ges} = k \sum_{n=1}^{N} [U_T(n)]^{3/2}$$

The calibration factor k that has to be determined one time at the start, can be determined by the weight or volume of a known number of drops using a conventional method in that the known volume or weight is divided by the sum of all volume signals $U_T^{3/2}$.

If the factor k is known, the dosed volume (weight) of a number of drops can be determined using this method.

The circuit always adjusts itself to the constant value of the simulated standard drop. Here, the light of the LED is decreased until a change in the luminous flux of 10%, for example, is produced. The luminous flux which is decreased by a drop is proportional to its shadow area and accordingly to its diameter squared. A microprocessor calculates the volume signal from the area signal and adds it up.

Identification Reference List
1 Light beam transmitter
2 Driver
3 Optical waveguides
4 Optical waveguides
5 Light beam receiver
6 Amplifier
7 Adder
8 Amplifier
9 Threshold value switch
10 Microprocessor control
11 Object 11a–11f
12 Direction of movement
13 Detection zone
14 Volume signals ($U_T$) 14a–14f
15 Measurement signal

The invention claimed is:

1. A method to determine the volume of small, spherical moving objects in which the objects move through the optical path of a photo electric sensor that comprises at least one light beam transmitter and one light beam receiver, and the change in the light intensity at the light beam receiver caused by objects passing through the optical path is registered and converted into an electrical measurement signal by means of an evaluation unit, characterized in that,
   before a measurement process, the amplitude of the electric signal is calibrated to a previously determined average standard volume of the objects and during the measurement process, the volume of each measured object is determined using the change in amplitude of the measurement signal.

2. A method according to claim 1, characterized in that the volume of an object is determined using the shading of the luminous flux of the photo electric sensor by the cross-sectional area of the object.

3. A method according to one of the above claims, characterized in that the volumes of all measured objects are added up to form a total volume.

4. A method according to claim 1, characterized in that calibration is effected by a defined change in the luminous flux generated by the light beam transmitter which corresponds to a change in the amplitude of the signal measured by the light beam receiver and thus to a specific shadow area.

5. A method according to claim 2, characterized in that calibration is effected by a defined change in the luminous flux generated by the light beam transmitter which corresponds to a change in the amplitude of the signal measured by the light beam receiver and thus to a specific shadow area.

6. A method according to claim 3, characterized in that calibration is effected by a defined change in the luminous flux generated by the light beam transmitter which corresponds to a change in the amplitude of the signal measured by the light beam receiver and thus to a specific shadow area.

* * * * *